Aug. 30, 1966 L. H. OTTOFY 3,269,734

PHONOGRAPHIC DEVICES

Filed Nov. 29, 1963 2 Sheets-Sheet 1

INVENTOR.
Ladis H. Ottofy
BY
Kent W. Wonnell att'y.

INVENTOR.
Ladis H. Ottofy
BY
Kent M. Wynnell
Att'y.

United States Patent Office 3,269,734

Patented August 30, 1966

3,269,734

PHONOGRAPHIC DEVICES

Ladis H. Ottofy, 4447 Irving Park Blvd., Chicago, Ill.

Filed Nov. 29, 1963, Ser. No. 326,871
2 Claims. (Cl. 274—42)

This invention relates to a record device in the form of a disk, box, container or plate comprising a cardboard, plastic or other diaphragm which may be made of cardboard, stiff paper, plastic or other material in the shape of a box, cup, plate or container, and actuated for producing an audible sound by means of a stylus, a plastic pick or stick, and by means of a pen or pencil of the present ball point type.

A present object of the invention is in using some form of stylus which is actually and manually moved with respect to a previously recorded message in a circular, rotary, elliptical or irregular pattern which may be in the form of a talkie tape and attached adhesively to a flexible and continuous sound groove such that the movement of the pencil or stylus will cause a vibration of the material of the disk itself or of the article to which it is attached which will produce an audible sound or message.

An important object of the invention is to provide a sound recording device of this kind which may be incorporated in a disk and placed at the bottom of a cylindrical or elliptical can or other device, or may be reproduced on a flat card with the message itself in oval or circular or elliptical form which makes it convenient for a stylus in the form of a pencil to follow and the other extent of the card or attached receptacle may produce the necessary vibration to cause an audible sound.

Other objects of the invention are to produce an oval or elliptical rather than a circular sound groove which may be formed in the bottom or side of a cup, box or other receptacle, or may be formed as a sheet which may be pressed or adhesively secured to the inside or outside of the bottom of a paper or other flexible cup or adhesively secured to the inside or outside of another receptacle to produce a record of this kind which needs no center hole for playing it as a record, but may be held in the hands of an operator, one holding the cup or box or other article in which the record is contained and the other hand holding a pencil, stylus or an ordinary ball point pen which follows the sound grooves and by the relative movement of the sound grooves and the stylus produces a sound effect which is magnified by the cup, box, sheet, strip, or other receptacle to produce an audible sound.

Other objects of the invention will appear in the specification and will be apparent from the accompanying drawings in which, FIG. 1 represents a sectional view of a plastic cup with a record formed as a part thereof in the bottom of the cup;

This invention therefore relates particularly to a sound reproducing device in which the phonographic record appear in lines which may be oval, straight and elliptical rather than simply round in form for reproducing sounds from plastic records which may be formed in, applied to strips, sheets and disks of paper and plastic material which is adapted to be attached to, adhesively applied and formed as part of the panels which make up other devices, to make audible sounds therefrom or the application of a stylus, the tip of a ball point pen and similar groove followers in which the record part is usually supported by one hand of a person, the stylus or other implement being moved in the groove by the other hand of the same person, and the edges of the receptacle to which the groove record is applied, being usually vibratory and otherwise movable to magnify and audibly reproduce the recorded sound groove so that it may be heard not only by the person who operates the device, but also by other persons who are adjacent or near to the one operating the devices. The message usually is a greeting, an advertising slogan, a direction to close the door, or the like, or some other catchy or admonitory direction rather than a lengthy or continued message.

Figure 1:
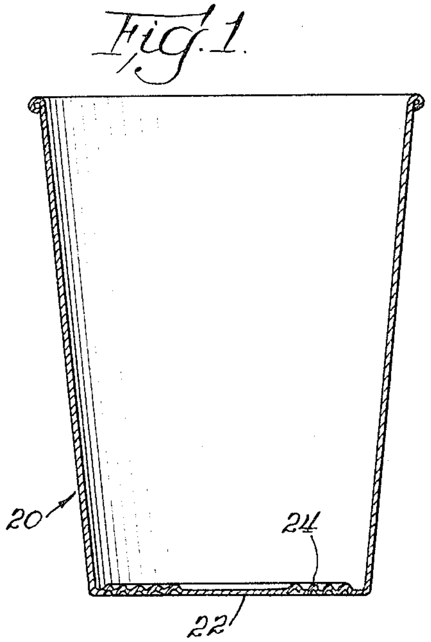

Referring now more particularly to the drawings, a receptacle 20, as shown in FIG. 1, may be made in the shape of a cup or some other commonly used construction in which a disk 22 having circular spiral or connected sound grooves 24 at the periphery of the bottom formed integrally or as a part thereof.

Figure 2:
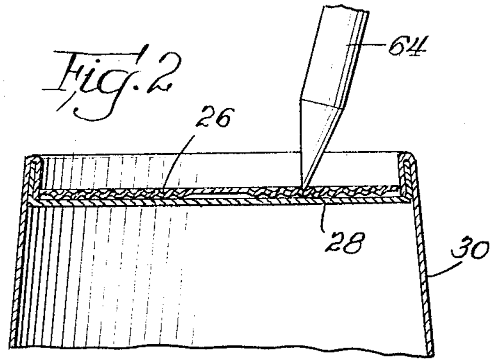
FIG. 2 is a part sectional view showing the bottom of a cup having a disk record in the bottom with continuous grooves therein adapted to be engaged by the point of a stylus or ball point pencil usually held in one hand while the receptacle is held in the other hand.
Figure 3:
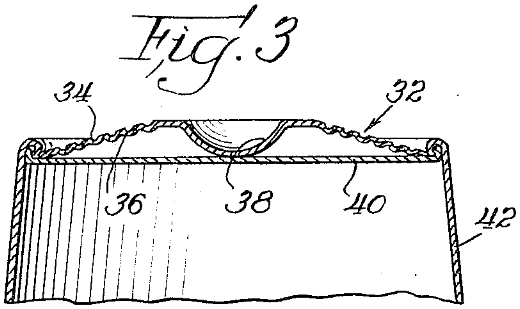
FIG. 3 is a sectional view showing a bellows type of record adapted to be spring held by the bellows around the periphery of a receptacle and having a central portion for contacting a cup with sound grooves between the central contact portion and the bellows periphery.

A disk 26 as shown in FIG. 2 may have the same or a different message, and may be of such a disclosure that it may be incorporated into or sprung in place below a bottom 28 of a receptacle 30 as shown in FIG. 2; or a circular disk 32 may have a peripheral spring bellows 34 with a sound groove 36 between the bellows and a central domed projection 38 adapted to bear against a bottom 40 of a plastic cup 42 or some other similar device, and to produce an improved phonographic device by this engagement in FIG. 4, a conventional phonographic disk 44 has a flanged periphery 46 adapting it to be sprung in place between bottom flanges 48 of a cup or other receptacle 50.

Figure 4:
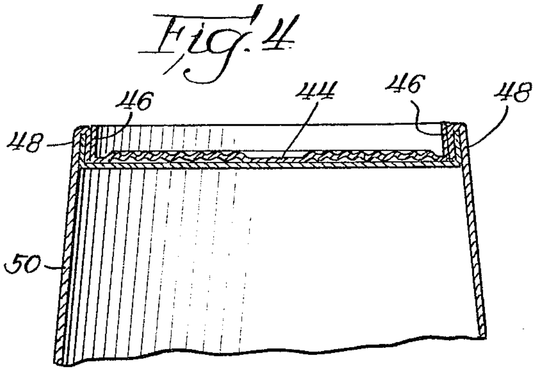
FIG. 4 shows a record in the form of a disk with the edge angularly bent thereto and the record forces inwardly at the edges within indented edges of the bottom of a receptacle, or seated inwardly at the bottom of some other receptacle.
Figure 5:
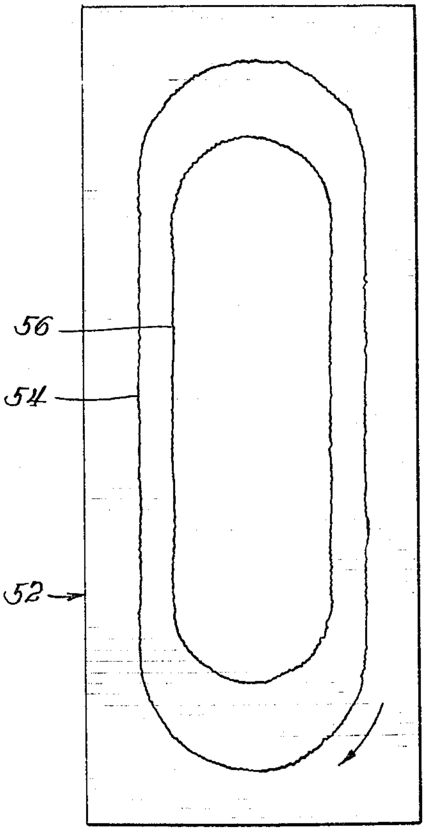
FIG. 5 represents a rectangular card of plastic or other material having an oval or elliptical sound groove therein adapted to form a separate greeting card and advertising medium, and also to be adhesively secured to the bottom or surface of some receptacle.
Figures 6, 7, 8, 9, 10:
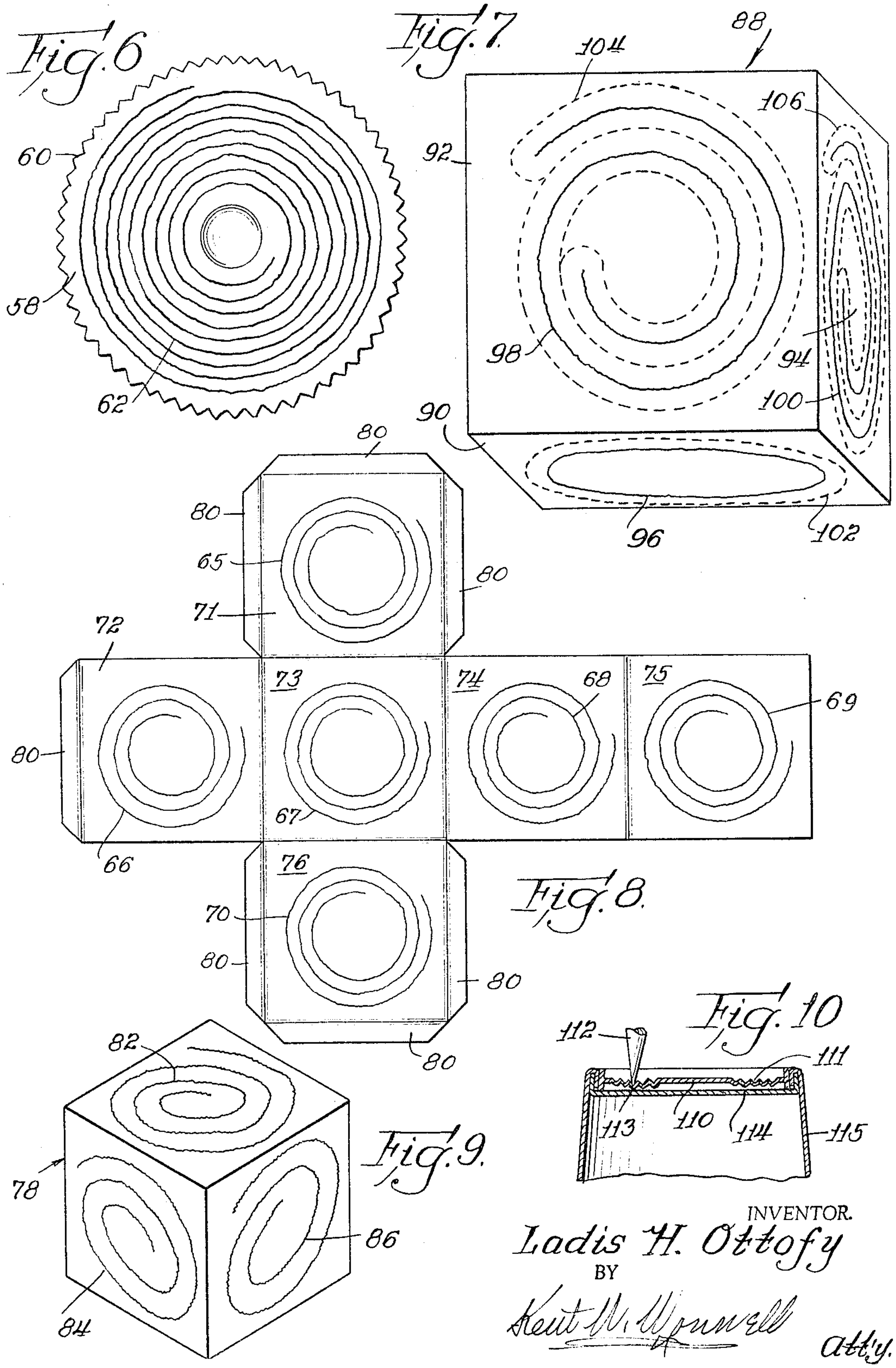
FIG. 6 represents a disk record having a serrated or notched edge to facilitate its mounting in a cup receptacle and the like, and to cause it to adhere within the periphery of a bottom as shown in FIG. 2.
FIG. 7 shows recorded sound grooves molded or applied in portions of a box or container with perforations bordering the sound grooves so that the narrow and spiral strip might be applied to and form the sides of a container and also the perforated portion alone may be removed and applied to a card or some other vibratory material for producing sound by the application of a stylus.
FIG. 8 represents a developed shape of a container which may be folded to form a cube or a box of another shape in which each of the joined sides making up the receptacle may contain similar or different sound grooves.
FIG. 9 shows a one-piece container having similar or different messages in each one of the panels or sides forming the device.
FIG. 10 is a sectional view of a thin flexible bellows type disk in a cup bottom, with a sound groove depressed by a stylus in the bottom of a V-shaped groove.

That the sound groove need not be circular or any particular shape is demonstrated by a construction like FIG. 5 in which a card 52 or some other plane sheet of plastic or the like may be provided with oval or elliptical sound grooves 54 and 56 which may extend lengthwise and separately from each other A disk record 58 as shown in FIG. 6 may have a serrated or toothed edge 60 to fit within the bottom flanges 48 of a cup 50 as shown in FIG. 4, with a sound groove 62 extending spirally in an oval direction as shown in FIG. 5 and even applied to the inside of a cup.

In all of these forms, sound may be reproduced by means of a stylus, or a pencil or a ball point pen 64 as shown in FIG. 2, the preferred operation being to insert the record within or at the bottom of a cup or other article, to hold the article itself in one hand, and to apply the stylus to the phonographic groove by moving it with the other hand in the groove, engaging the projections thereof, the vibration of the cup or other article magnifying the sound and making the word or words audible when near the receptacle or within a short distance therefrom.

Such phonographic sounds are also reproduced by incorporating a number of such grooves 65, 66, 67, 68, 69 and 70, as shown in FIG. 8, into corresponding panels 71, 72, 73, 74, 75 and 76 which are foldable together to form some regular body. In this case, having six panels, they are foldable to form a cube 78, the panels being secured in an ordinary manner to each other to produce the cube by flaps 80 which are turned inwardly and adhesively secured to the other panels in a well known manner to form and maintain the cubical devices.

In the cube 78 as shown in FIG. 9, phonographic grooves 82, 84 and 86 are shown, to anyone of which a stylus may be applied on the outside, with one hand, while holding the cube in the other, resulting in the reproduction of the corresponding phonographic method which is made audible because the material is phonographically resonant.

In the form shown by FIG. 7, a rectangular box 88 of resonant material may be open at one side and have a bottom 90 and other panels 92 and 94 which are provided with phonographic grooves 96, 98, and 100 respectively with perforations 102 closely bordering both sides of a sound groove as 96 or with partially broken lines 104 also closely bordering the sound grooves 98 and partially broken lines 106 closely bordering sound grooves 94. These sound grooves or the entire area within the perforated or broken lines 102, 104, 106 may be severed from the panels in which they appear and adhesively or otherwise applied to other cards, panels or receptacles which are phonographically resonant.

The paths of the grooves may be circular, spiral, oval or elliptical and instead of the panels being square or rectangular, they may be circular, or the removed area may be circular and applied to the inside or outside of a circular receptacle, such as a cup as shown in FIGS. 1, 2, 3 and 4 and the panel upon which the phonographic message appears may be applied as described therein to the inside or outside of the cup, preferably at the bottom thereof.

In all of these forms, a sound groove is produced in suitable plastic material in the form of a panel, strip or disk and preferably is applied to some other article or receptacle such as a cup, a box or even a thin sheet as this forms a convenient way first to make or produce the sound groove, or a number of them, particularly if it is to be used for advertising purposes and then to apply the formed sound groove to some other resonant receptacle. As thus reproduced, the receptacle is intended to be held in one hand while applying a stylus which may be in the form of a ball point pen or a pencil, as stated in the other hand of the same person. The stylus is then moved over the phonographic projections and usually in a continuous path to reproduce sound from the groove and to magnify the sound by means of resonant sides of the cup, box or other receptacle to which the sound groove is applied, either at the inner or outer side thereof.

In the form shown by FIG. 10, a thin bellows type of disk 110 has a V-shaped sound groove 111 pressed into the bottom of a cup 115 normally held out of contact with the bottom, but when pressed inwardly by a stylus 112, the point presses the under side 113 inwardly until it touches the cup bottom 114 only when the stylus (or pen) pressed the sound groove against the bottom, thereby focusing the point of sound reproduction, and reducing the possibility of a sound damping effect, which might occur if the entire sound record touched the bottom of the cup 115.

While I have thus described the invention as applied to various simple and related structures, it is obvious that all of them relate substantially to the same invention, and should be regarded as illustrations or examples rather than as limitations or restrictions of the invention, since various changes in the construction, combination, and arrangement of the parts may be made without departing from the spirit and scope of the invention.

I claim:

1. In a portable phonographic device actuated by a relatively manually movable stylus, the combination with a resonant cup receptacle comprising a bottom and sides connected with an outside bottom flange, of a flexible plastic disk having a continuous sound reproducing groove at one side within and separate from the outer peripheral edge thereof, and means in the edge for removably attaching the disk to the outside bottom flange against the bottom with the groove outermost, adapted to reproduce and magnify sounds from the groove when the stylus is moved thereover, the grooved disk leaving a central domed projection from the side opposite the groove to bear against said bottom when it is attached by said means.

2. In a portable phonographic device actuated by a relatively manually movable stylus, the combination with a resonant cup receptacle comprising a bottom and sides connected with an outside bottom flange, of a flexible plastic disk having a continuous sound reproducing groove at one side within and separate from the outer peripheral edge thereof, and means in the edge for removably attaching the disk to the outside bottom flange against the bottom with the groove outermost, adapted to reproduce and magnify sounds from the groove when the stylus is moved thereover, the sound grooved disk having said removably attaching edge means and peripheral spring bellows means between the sound groove and the attaching means for holding the disk in place.

References Cited by the Examiner

UNITED STATES PATENTS

| | | | |
|---|---|---|---|
| 948,137 | 2/1910 | Haywood | 274—42 |
| 1,082,709 | 12/1913 | Schumacher | 274—42 X |
| 1,464,827 | 8/1923 | Morrison | 274—42 |
| 1,877,079 | 9/1932 | Sturgis | 274—42 X |
| 2,020,381 | 11/1935 | Labowitz et al. | 274—42 |
| 2,997,306 | 8/1961 | Hicks | 274—42 |
| 3,000,540 | 9/1961 | Strauss | 274—42 |
| 3,145,026 | 8/1964 | Shaw | 274—42 |

NORTON ANSHER, *Primary Examiner.*

C. B. PRICE, *Assistant Examiner.*